US009997771B2

United States Patent
Suzuki et al.

(10) Patent No.: US 9,997,771 B2
(45) Date of Patent: Jun. 12, 2018

(54) NEGATIVE ELECTRODE MATERIAL FOR LITHIUM ION SECONDARY BATTERY AND MANUFACTURING METHOD OF THE SAME, NEGATIVE ELECTRODE FOR LITHIUM ION SECONDARY BATTERY AND MANUFACTURING METHOD OF THE SAME, AND LITHIUM ION SECONDARY BATTERY

(71) Applicant: Hitachi, Ltd., Tokyo (JP)

(72) Inventors: Shuichi Suzuki, Tokyo (JP); Etsuko Nishimura, Tokyo (JP); Makoto Okai, Tokyo (JP); Toshio Abe, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 204 days.

(21) Appl. No.: 15/100,901

(22) PCT Filed: Dec. 5, 2013

(86) PCT No.: PCT/JP2013/082675
§ 371 (c)(1),
(2) Date: Jun. 1, 2016

(87) PCT Pub. No.: WO2015/083262
PCT Pub. Date: Jun. 11, 2015

(65) Prior Publication Data
US 2016/0308194 A1 Oct. 20, 2016

(51) Int. Cl.
*H01M 4/133* (2010.01)
*H01M 4/136* (2010.01)
(Continued)

(52) U.S. Cl.
CPC ........... *H01M 4/136* (2013.01); *H01M 2/162* (2013.01); *H01M 2/1653* (2013.01); *H01M 4/043* (2013.01); *H01M 4/0404* (2013.01); *H01M 4/0471* (2013.01); *H01M 4/134* (2013.01); *H01M 4/1395* (2013.01); *H01M 4/1397* (2013.01); *H01M 4/382* (2013.01); *H01M 4/386* (2013.01); *H01M 4/48* (2013.01); *H01M 4/58* (2013.01); *H01M 4/622* (2013.01); *H01M 4/623* (2013.01); *H01M 4/625* (2013.01); *H01M 4/661* (2013.01); *H01M 10/0525* (2013.01); *H01M 10/0568* (2013.01); *H01M 10/0569* (2013.01); *H01M 4/366* (2013.01); *H01M 10/052* (2013.01); *H01M 2004/027* (2013.01);
(Continued)

(58) Field of Classification Search
CPC .... H01M 4/136; H01M 2/162; H01M 2/1653; H01M 4/133
See application file for complete search history.

(56) References Cited

FOREIGN PATENT DOCUMENTS

JP 2009-245773 A 10/2009
JP 2011-018575 A 1/2011
(Continued)

*Primary Examiner* — Olatunji Godo
(74) *Attorney, Agent, or Firm* — Volpe and Koenig, P.C.

(57) ABSTRACT

To provide a negative electrode material having a high initial capacity and a long charge and discharge cycle life A negative electrode material according to the present invention contains a particle of a negative electrode active material that occludes and releases lithium ions and a carbon fiber, wherein the negative electrode active material occludes lithium by forming an alloy with the lithium, a surface of the negative electrode active material particle is coated with carbon, and the carbon fiber is bonded to the surface of the carbon via an adhesive resin.

15 Claims, 2 Drawing Sheets

(51) Int. Cl.
 H01M 4/38     (2006.01)
 H01M 4/62     (2006.01)
 H01M 2/16     (2006.01)
 H01M 4/04     (2006.01)
 H01M 4/134    (2010.01)
 H01M 4/1395   (2010.01)
 H01M 4/1397   (2010.01)
 H01M 4/48     (2010.01)
 H01M 4/58     (2010.01)
 H01M 4/66     (2006.01)
 H01M 10/0525  (2010.01)
 H01M 10/0568  (2010.01)
 H01M 10/0569  (2010.01)
 H01M 4/36     (2006.01)
 H01M 10/052   (2010.01)
 H01M 4/02     (2006.01)

(52) U.S. Cl.
 CPC .. *H01M 2004/028* (2013.01); *H01M 2220/20* (2013.01); *H01M 2220/30* (2013.01); *H01M 2300/004* (2013.01)

(56) References Cited

FOREIGN PATENT DOCUMENTS

| | | |
|---|---|---|
| JP | 2011-076743 A | 4/2011 |
| JP | 2012-099341 A | 5/2012 |
| JP | 2012-119214 A | 6/2012 |
| JP | 2013-168328 A | 8/2013 |
| JP | 2013-171629 A | 9/2013 |
| JP | 2013-175315 A | 9/2013 |

NEGATIVE ELECTRODE MATERIAL FOR LITHIUM ION SECONDARY BATTERY AND MANUFACTURING METHOD OF THE SAME, NEGATIVE ELECTRODE FOR LITHIUM ION SECONDARY BATTERY AND MANUFACTURING METHOD OF THE SAME, AND LITHIUM ION SECONDARY BATTERY

TECHNICAL FIELD

The present invention relates to a negative electrode material for a lithium ion secondary battery and a manufacturing method of the same, a negative electrode for a lithium ion secondary battery and a manufacturing method of the same, and a lithium ion secondary battery.

BACKGROUND ART

Lithium ion secondary batteries have higher energy densities than nickel-cadmium secondary batteries and nickel hydrogen secondary batteries and thus are widely used as power units of notebook computers and mobile phones. While electric cars and hybrid cars have been developed as environment-friendly cars, the application of lithium ion secondary batteries as a kind of nonaqueous secondary batteries to power units for automobiles have been discussed.

In general, a lithium ion secondary battery is constructed by housing a positive electrode in which a current collector is coated with positive electrode active material particles using a binder, a negative electrode in which a current collector is similarly coated with negative electrode active material particles using the binder, and an electrolyte layer arranged in the center thereof in a battery case. As the negative electrode active material of such a lithium ion secondary battery, a carbon material such as graphite as shown in PTL 1 or a material forming an alloy (hereinafter, an alloy based material) of silicon, tin and the like with lithium as shown in PTLs 2, 3 is used. The alloy based material is characterized in that the lithium occlusion amount, that is, the charged capacity thereof is larger than that of the carbon material and enables a larger capacity of a battery. However, the alloy based material undergoes large volume changes accompanying the charge and discharge and thus, particles bonded by a binder are more likely to be disconnected. Particles whose connection to other particles is disconnected lose an electron conduction path and no longer contribute to subsequent charges and discharges. That is, a problem of the alloy based material is that the reduction in capacity accompanying the charge and discharge cycle is large.

To inhibit the reduction in capacity of a negative electrode using the alloy based material, it is effective to prevent an electron conduction path between active material particles from being lost due to volume changes. As such a technology, for example, PTL 4 discloses a lithium secondary battery including a negative electrode in which a negative electrode active material layer containing negative electrode active material particles and a negative electrode binder is formed on the surface of a negative electrode current collector, a positive electrode, and a nonaqueous electrolyte, wherein mixed particles obtained by mixing a particle A having a particle distribution of the presence of 60% by volume or more in the range of 3 µm or more and 6 µm or less in median diameter (D50) and 2 µm or more and 7 µm or less in particle size and containing silicon and/or a silicon alloy and a particle B having a particle distribution of the presence of 60% by volume or more in the range of 9 µm or more and 15 µm or less in median diameter (D50) and 7 µm or more and 17 µm or less in particle size and containing silicon and/or a silicon alloy in the range of the weight ratio (particle A:particle B) 10:90 to 25:75 are used as the negative electrode active material particles and a polyimide resin having a specific structure as the negative electrode binder. According to PTL 4, degradation of current collecting properties inside the negative electrode accompanying the passage of charge and discharge cycles is suppressed by a high level of adhesiveness of the polyimide resin and silicon so that a lithium secondary battery having a high energy density and superior in charge and discharge cycle characteristics can apparently be produced.

PTL 5 discloses a negative electrode material created by a conductivity improver being contained in a composite material created by combining particles containing a solid phase A made mainly of Si and a solid phase B made of an intermetallic compound of at least one metal selected from Cr and Ti and Si with a carbon material. According to PTL 5, the particle shape is retained when the volume expands and when used in a lithium ion secondary battery, a negative electrode material superior in repeated charge and discharge cycle characteristics while retaining a high capacity and superior in charge and discharge efficiency in the initial cycle is apparently provided.

PTL 6 discloses a negative electrode material for a lithium ion secondary battery containing negative electrode active material powder containing silicon powder in which the surface of particles is coated with a carbon film, conductive carbon powder existing among particles of the negative electrode active material powder and having a smaller average particle size of primary particles than that of the negative electrode active material powder, and a conductive carbon fiber coexisting with the conductive carbon powder among particles of the negative electrode active material powder and having a thinner average diameter of fiber than the average particle size of primary particles of the negative electrode active material powder and the conductive carbon powder and a longer average length of fiber than the average particle size of primary particles of the conductive carbon powder. According to PTL 6, conduction between the negative electrode active material and the current collector is maintained even if volume changes of silicon particles arise accompanying the charge and discharge and therefore, degradation of battery characteristics caused by volume changes of silicon particles accompanying the charge and discharge is apparently suppressed.

PTL 7 discloses a lithium secondary battery negative electrode mixture containing a negative electrode active material (A) and a binder (B), wherein the negative electrode active material (A) contains composite particles made of silicon containing particles containing an alloy, oxide, nitride, or carbide of silicon capable of occluding/releasing lithium ions and a resin carbon material surrounding the silicon containing particles and a silicon containing network structure bound to the surface of the composite particles and made of nano-fibers and/or nano-tubes surrounding the composite particles and the binder (B) contains polyimide. According to PTL 7, pulverization of the negative electrode active material caused by the charge and discharge cycle is suppressed by an extremely high synergistic effect of the negative electrode active material and the binder and also adhesiveness between nano-fibers and/or nano-tubes and composite particles is maintained and therefore, the negative electrode active material is inhibited from dropping from the electrode and a lithium secondary battery negative electrode mixture exhibiting hitherto unseen superior charge and discharge cycle characteristics, a lithium secondary battery negative electrode, and a lithium secondary battery using the negative electrode are apparently provided.

PTL 8 discloses a negative electrode material for a nonaqueous electrolyte secondary battery made of a coated mixture in which each of (A) particles having a structure in which silicon oxide particles represented by the general formula SiOx ($1.0 \leq x < 1.1$) or microcrystals of silicon are dispersed in a silicon based compound and (B) composite particles in which the surface of an Si particle is coated with a carbon nano-tube, carbon nano-fiber, or carbon fiber is further coated with a carbon film. According to PTL 8, a lithium ion secondary battery and an electrochemical capacitor achieving high initial charge and discharge efficiency and high capacities and superior in cycle characteristics can apparently be obtained.

CITATION LIST

Patent Literature

PTL 1: JP 2012-119214 A
PTL 2: JP 2013-171629 A
PTL 3: JP 2013-175315 A
PTL 4: JP 2009-245773 A
PTL 5: JP 2013-168328 A
PTL 6: JP 2011-18575 A
PTL 7: JP 2011-76743 A
PTL 8: JP 2012-99341 A

SUMMARY OF INVENTION

Technical Problem

However, in PTL 4, after a current collector being coated, polyimide needs to be thermally treated at 300° C. or higher to increase in strength. In this case, heat treatment in a vacuum or an inert atmosphere such as argon is needed to inhibit oxidation of the current collector, which could lead to higher manufacturing costs.

Volume changes of an alloy based material are large even by the method as described in PTL 5 and the capacity may decrease after connections to graphite are lost.

In PTL 6, a large amount of carbon fiber that does not contribute to a charge and discharge needs to be added to reliably bring carbon fibers into contact with an alloy based material, which could lead to reduced initial capacities.

In PTL 7, a carbon precursor mixed with the negative electrode active material is carbonized (400 to 1400° C.), but if a negative electrode mixture is heated at such a high temperature, an oxide is generated and electron conductivity could be degraded.

Further, in PTL 8, the carbon film may not have a sufficient adhesive force of negative electrode active material particles and carbon. In addition, the method of creating a carbon film by chemical vapor deposition as described in PTL 8 could invite an increase of manufacturing costs.

Therefore, in view of the above circumstances, an object of the present invention is to provide a negative electrode material for a lithium ion secondary battery capable of providing a lithium ion secondary battery that does not need heat treatment in a vacuum or an inert atmosphere, has a high initial capacity, and has a small reduction in capacity in the charge and discharge cycle.

Solution to Problem

To achieve the above object, an aspect of the present invention provides a negative electrode material for a lithium ion secondary battery containing a particle of a negative electrode active material that occludes and releases lithium ions and a carbon fiber, wherein the negative electrode active material occludes lithium by forming an alloy with the lithium, a surface of the particle of the negative electrode active material is coated with carbon, and the carbon fiber is bonded to the surface of the carbon via an adhesive resin.

Advantageous Effects of Invention

According to the present invention, a negative electrode material for a lithium ion secondary battery capable of providing a lithium ion secondary battery that does not need heat treatment in a vacuum or an inert atmosphere, has a high initial capacity, and has a small reduction in capacity in the charge and discharge cycle can be provided.

DESCRIPTION OF EMBODIMENTS

Hereinafter, embodiments of the present invention will be described using the drawings and the like. However, the description that follows shows concrete examples of content of the present invention and the present invention is not limited by the following description and thus, various alterations and modifications can be made by persons skilled in the art without deviating from technical ideas disclosed by this specification.

(Negative Electrode Material for a Lithium Ion Secondary Battery)

Figure 1:
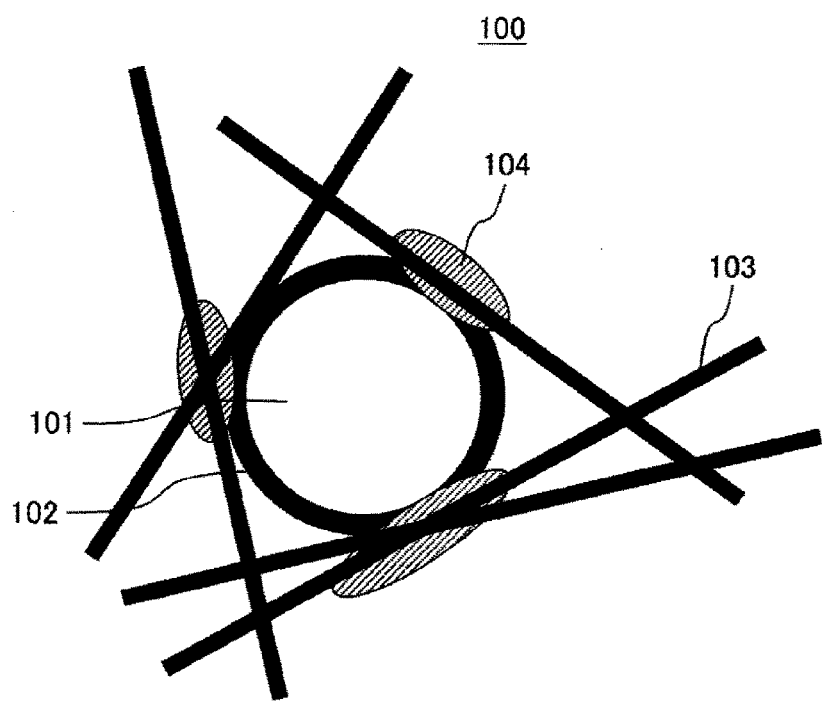
FIG. 1 is a schematic sectional view showing an example of a negative electrode material for a lithium ion secondary battery according to the present invention.

FIG. 1 is a schematic sectional view showing an example of a negative electrode material for a lithium ion secondary battery according to the present invention. As shown in FIG. 1, a negative electrode material 100 according to the present invention contains a negative electrode active material particle 101 whose surface is coated with carbon 102 and a carbon fiber 103 bonded to the surface of the carbon 102 via an adhesive resin 104. By adopting such a configuration, even if the negative electrode active material particle 101 expands and contracts accompanying a charge and discharge, an electron conduction path is secured through the carbon fiber 103 bonded to the carbon 102 via the adhesive resin 104. Here, the carbon (coated carbon) 102 assumes the role of spreading the electron conduction path linked from the carbon fiber 103 to the negative electrode active material particle 101 as a whole.

As the negative electrode active material particle 101, in contrast to the carbon material such as graphite, a material that occludes lithium by forming an alloy with lithium is preferably used. For example, Si (silicon), Sn (tin), Al (aluminum), Mg (magnesium), P (phosphorus), or Sb (antimony) can be used. Also, a material that forms a compound with lithium such as $Fe_2O_3$ (ferric oxide (III)) and NiO (nickel oxide (II)) is preferably used. When compared with graphite, these active materials have large volume changes accompanying lithium occlusion, but have a lithium occlusion amount and can increase the capacity of a lithium ion secondary battery. Particularly, among these, Si has the largest theoretical capacity density of about 4200 mAh/g and therefore, it is preferable to use Si or an Si compound for the negative electrode active material.

The Si compound is not specifically limited and any Si compound that occludes and releases lithium ions may be used and, for example, an oxide such as SiOx (silicon oxide) and SiNx (silicon nitride), a nitride, or a transition metal compound such as SiNix may be used.

The negative electrode active material particle 101 in the present invention is not limited to the above materials and the present invention achieves its effects particularly when a negative electrode active material whose volume changes significantly accompanying the occlusion and release of lithium.

The average particle size of the negative electrode active material particle 101 is preferably 100 nm or more and 20 μm or less. If the average particle size is smaller than 100 nm, the specific surface area is too large and thus, the effect of an electrolyte decomposition secondary reaction occurring on the negative electrode active material particle 101 grows, which is not preferable. The electrolyte decomposition secondary reaction is concretely a reaction in which ethylene carbonate or the like as an electrolyte component is reductively decomposed on the negative electrode active material particle 101 and electrons are consumed in this reaction, causing the reduction in capacity of the battery. If the average particle size is larger than 20 μm, the negative electrode active material particle 101 itself becomes more brittle, which is not preferable.

From the viewpoint of electron conductivity, the crystal structure of the carbon 102 is preferably the graphite structure, instead of the diamond structure. However, the size of crystallite is not specifically limited because sufficient electron conductivity manifests itself even if the crystallite is so small that no crystal peak is detected in X ray diffraction measurement.

The thickness of film of the carbon 102 is preferably 10 nm or more and 1 μm or less. If the thickness is less than 10 nm, it is difficult to secure sufficient electron conductivity, which is not preferable. If the thickness is more than 1 μm, the carbon film itself hardly occludes and releases lithium and thus, the capacity density of the negative electrode decreases, which is not preferable.

As the method of coating the negative electrode active material particle 101 with the carbon 102, for example, a method of growing a carbon film on the surface of the negative electrode active material particle 101 by the chemical vapor deposition using a hydrocarbon based gas as a material or a method of coating the negative electrode active material particle 101 with organic matter having carbon as a main component and carbonizing the film can be used.

In the present invention, the carbon fiber 103 is intended to have carbon as a main component (the carbon composition is 99% or more and nitrogen (N), sulfur (S), oxygen (O) and the like may be contained as impurities) and a graphite structure in a high aspect ratio and more specifically, the so-called carbon nano-tube and carbon fiber are used. It is preferable to use the carbon fiber 103 whose average aspect ratio (length/diameter) is 10 or more.

The average length of the carbon fiber 103 is preferably longer than the average particle size (the average particle size of the negative electrode active material particle 101 and the film thickness of the carbon 102) of the negative electrode active material particle 101 coated with the carbon 102. If, as the negative electrode active material particle 101 coated with the carbon 102, for example, the one having the average particle size of 1 μm is used, it is preferable to use the carbon fiber 103 whose average length is longer than 1 μm and whose average diameter is 100 nm or less. If the average length of the carbon fiber is shorter than the average particle size of the negative electrode active material, the effect of forming an electron conduction path to surrounding particles is weakened, which is not preferable. If the average aspect ratio is less than 10 and the carbon fiber is thick, it is difficult to firmly bond to the negative electrode active material particle 101 (a larger amount of the adhesive resin 104 is needed to firmly bond the carbon fiber to the negative electrode active material 101), which is not preferable.

It is preferable to use a high-strength (high tensile strength) resin as the adhesive resin 104 to bond the carbon fiber 103 to the surface of the carbon 102. More specifically, the resin preferably has the tensile strength of 50 MPa or more. Particularly preferably, an imide resin such as polyimide (tensile strength: 100 MPa) and polyamide-imide (tensile strength: 100 MPa), polyalginic acid salt (sodium polyalginate (tensile strength: 60 MPa) and the like), or polyacrylic acid salt (sodium polyacrylate and the like) is used. These adhesive resins contained in the negative electrode material 100 can be measured through an electron microscope (for example, SEM-EDX) to which an elemental analyzer is attached. The tensile strength is a value measured according to the following procedure. First, a single film of each resin is formed and stamped into a dumbbell shape of the length 10 mm and the width 5 mm. The film is mounted on a tensile testing machine (manufactured by Shimadzu Corporation, model: AGS-H 500N), a tensile test thereof is conducted at speed 5 mm/min, and the maximum stress in the test is evaluated as the tensile strength.

In the present invention, the length and diameter of the carbon fiber 103 and the particle size of the negative electrode active material particle 101 are values measured through an electron microscope. In the present invention, the "average length" and "average particle size" are values obtained by measuring and averaging the length of fibers and the particle size of the negative electrode active material within a certain field of view of the electron microscope. The "average aspect ratio" is a value obtained by calculating and averaging the aspect ratio by measuring the length and diameter of fibers within a certain field of view of the electron microscope.

(Negative Electrode for a Lithium Ion Secondary Battery)

Figure 2:
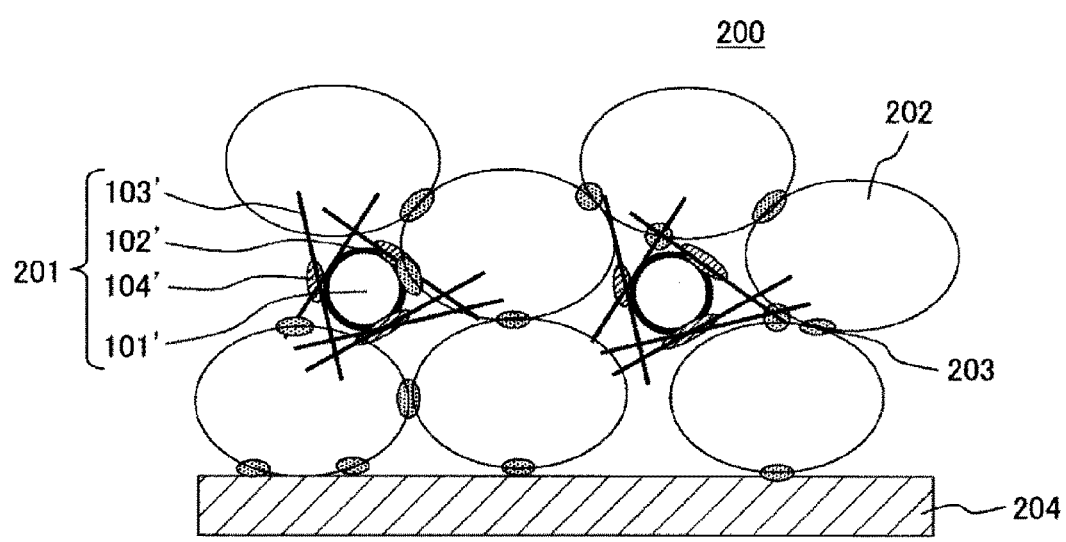
FIG. 2 is a schematic sectional view showing an example of a negative electrode for a lithium ion secondary battery according to the present invention.

FIG. 2 is a schematic sectional view showing an example of a negative electrode for a lithium ion secondary battery according to the present invention. As shown in FIG. 2, a negative electrode 200 according to the present invention has a layer containing a negative electrode material 201, a carbon material 202 that occludes and releases lithium ions, and a binder resin 203 formed on a negative electrode current collector 204. A carbon fiber 103' extends from the negative electrode material 201 to the surroundings to form a good electron conduction path to the carbon material 202. Due to such a configuration, even if a negative electrode active material particle 101' contained in the negative electrode material 201 expands or contracts, the electron conduction path is maintained and the reduction in capacity is less likely to occur. In addition, the carbon fiber 103' is bonded to the negative electrode active material particle 101' in advance in the negative electrode material 201 and thus, the electron conduction path between the negative electrode active material and the carbon material 202 therearound with the minimum addition of carbon fiber so that the reduction in capacity of the negative electrode can be inhibited.

As the carbon material 202 that occludes and releases lithium ions, graphite, easily graphitizable carbon, and hardly graphitizable carbon are preferably used and, among these, graphite is preferable because the potential when lithium ions are occluded are the lowest and thus, the battery voltage can be raised. When compared with the negative material active material particle 101' contained in the negative electrode material 201, the occlusion amount of lithium ions of the carbon material 202 is small, but the carbon material 202 is a material whose expansion is small and superior in electron conductivity. Thus, it is preferable to use the negative electrode material 201 and the carbon material 202 in combination. Incidentally, carbon black used generally as a conductive material is not a material that occludes and releases lithium ions and is not included in the carbon material 202 of the present invention.

The binder resin (binding agent) 203 used to form the negative electrode 200 is not specifically limited and, for example, polyethylene, polypropylene, polytetrafluoroethylene, polyvinylidene fluoride, styrene-butadiene rubber, polyalginic acid, polyacrylic acid or the like can be used. Polyimide and polyamide-imide need to be thermally treated at about 300° C. to improve strength thereof and heat treatment in a vacuum or an inert atmosphere is needed to inhibit oxidation of the negative electrode current collector 204 and thus, manufacturing costs increase, which is not preferable.

The negative electrode current collector 204 is not specifically limited and any material less likely to degenerate in the battery and having electron conductivity may be used and copper, nickel, stainless and the like may be used. Among these, copper is preferably used. The thickness of the negative electrode current collector 204 is not specifically limited, but is preferably 1 µm or more and 100 µm or less.

The density of the negative electrode 200 is preferably 50% or more and 90% or less of the average true density of the material (excluding the negative electrode current collector) constituting the negative electrode. If the density is less than 50%, the amount of the negative electrode active material particles 101' contained in the unit volume decreases, leading to a lower energy density. If the density is more than 90%, the amount of electrolytic solution in the negative electrode 200 decreases with decreasing voids inside the negative electrode 200 and lithium ion conduction is lost, which is not preferable.

(Manufacturing Method of a Negative Electrode Material for a Lithium Ion Secondary Battery)

The manufacturing method of the negative electrode material 100 for a lithium ion secondary battery according to the present invention includes (i) a negative electrode material solution preparation process of mixing the negative electrode active material particle 100 coated with the carbon 102, the carbon fiber 103 and a solution in which the adhesive resin 104 is dissolved in a solvent are mixed and (ii) a drying process (first drying process) of removing the solvent by heating the negative electrode material solution. The method of coating the negative electrode active material particle 101 with the carbon 102 is as described above. Hereinafter, (i) and (ii) described above will be described in detail.

(i) Negative Electrode Material Solution Preparation Process

In the negative electrode material solution preparation process, the negative electrode active material particle 101 coated with the carbon 102 and occluding lithium ions by forming an alloy with lithium, the carbon fiber 103, and a solution in which the adhesive resin 104 is dissolved in a solvent are mixed. The solvent is not specifically limited and any solvent that dissolves the adhesive resin 104 may be used and when polyimide or polyamide-imide is used as the adhesive resin 104, N-methyl-2-pyrrolidone (NMP) is preferably used as the solvent. When polyalginic acid salt or polyacrylic acid salt is used as the adhesive resin 104, water is preferably used as the solvent.

The mixed amount of carbon fiber is preferably in the range of 98:2 or more and 80:20 or less in the mass ratio of (negative electrode active material particle 101 coated with the carbon 102):(carbon fiber 103). If the carbon fiber 103 less than the above range, the effect as an electron conduction path diminishes. If the carbon fiber 103 more than the above range, the ratio of the negative electrode active material particle 101 decreases and the capacity density decreases, which is not preferable.

The ratio of (total of the negative electrode active material particle 101 coated with the carbon 102 and the carbon fiber 103):(adhesive resin 104) is, as the mass ratio, preferably in the range of 99:1 or more and 90:10 or less. If the amount of the adhesive resin 104 is less than the above range, the carbon fiber 103 is more likely to come off, which is not preferable. If the amount of the adhesive resin 104 is more than the above range, the resistance rises due to hindrance of the occlusion and release of lithium ions and also the ratio of the negative electrode active material particle 101 decreases and the capacity density decreases, which is not preferable.

(ii) Drying Process

In the drying process, the solvent is removed (dried) by heating the negative electrode material solution to obtain the negative electrode material 100. The drying method is not specifically limited and the solution may be heated at temperature at which the solvent can be removed in the atmosphere. When an imide resin is used as the adhesive resin 104, the strength of the resin can further be increased through crosslinking of the resin by heat treatment at 300° C. after the removal of solvent. In this case, there is no material that is easily oxidized such as a current collector and the treatment in the atmosphere is possible so that manufacturing costs will not be significantly raised.

(Manufacturing Method of the Negative Electrode for a Lithium Ion Secondary Battery)

The manufacturing method of the negative electrode 200 for a lithium ion secondary battery according to the present invention includes (iii) a negative electrode slurry preparation process in which the negative electrode material 201 according to the present invention manufactured by the manufacturing method of a negative electrode material for a lithium ion secondary battery according to the present invention described above, the carbon material 202 that occludes and releases lithium ions, a solution in which the binder resin 203 is dissolved in a solvent are mixed, (iv) a coating process in which the current collector is coated with a negative electrode slurry, and (v) a drying process (second drying process) of drying the negative electrode slurry with which the current collector is coated. Hereinafter, (iii) to (v) described above will be described in detail.

(iii) Negative Electrode Slurry Preparation Process

In the negative electrode slurry preparation process, the negative electrode material 201, the carbon material 202 that occludes and releases lithium ions, and a solution in which the binder resin 203 is dissolved in a solvent are mixed. The solvent is not specifically limited and any solvent that dissolves the binder resin 203 may be used, but a solvent that does not dissolve an adhesive resin 104' is used. More specifically, for example, polyvinylidene fluoride (PVDF) is preferable as the binder resin 203.

(iv) Coating Process

In the coating process, the current collector is coated with the negative electrode slurry prepared above. The coating method is not specifically limited and the coating method in a manufacturing method of the negative electrode of a common lithium ion secondary battery can be used. For example, the doctor blade, the dipping method, or the spray method may be used.

(v) Drying Process

In the drying process, the solvent is removed (dried) by heating the negative electrode slurry with which the current collector is coated to obtain the negative electrode 200. The drying method is not specifically limited and the solution may be heated at temperature at which the solvent can be removed in the atmosphere.

The negative electrode 200 according to the present invention is characterized, as described above, by being manufactured by undergoing two processes including a first process of manufacturing the negative electrode material 201 having the negative electrode active material particle 101' to which the carbon fiber 103' is bonded and a second process of subsequently manufacturing the negative electrode 200 using the negative electrode material 201. In the conventional manufacturing method of the negative electrode having carbon fiber, a negative electrode slurry is created by mixing a negative electrode active material, a carbon fiber, and a binding agent (binder resin in the present embodiment). That is, the first process and the second process in the manufacturing method of the negative electrode 200 in the present invention are a one-stage process. In a method of manufacturing in one stage, a large amount of carbon fiber that does not contribute to a charge and discharge is added more than necessary and the initial capacity could be reduced. In contrast, the negative electrode 200 according to the present invention is manufactured after the carbon fiber 103' is bonded to the negative electrode active material particle 101' (carbon 102') and therefore, an electron conduction path between the negative electrode active material particle 101' and the carbon material 202 there-around can efficiently be formed with the minimum amount of added carbon fiber in the negative electrode 200 so that the reduction in capacity of the negative electrode can be inhibited.

(Lithium ion secondary battery)

Figure 3:
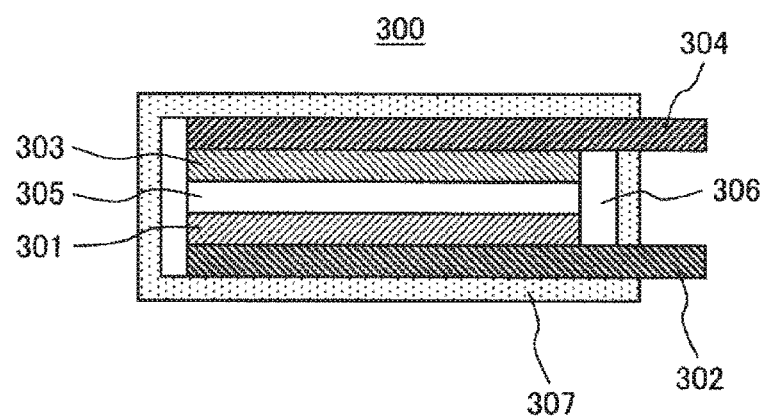
FIG. 3 is a schematic sectional view showing an example of a lithium ion secondary battery according to the present invention.

FIG. 3 is a schematic sectional view showing an example (laminated type) of a lithium ion secondary battery according to the present invention. As shown in FIG. 3, a lithium ion secondary battery 300 according to the present invention includes a negative electrode 301 according to the present invention provided on a negative electrode current collector 302 and a positive electrode 303 provided on a positive electrode current collector 304, and a laminate of the above elements and a separator 305 is housed in an insulating sealed case 307. The negative electrode current collector 302 and the positive electrode current collector 304 are drawn out from the sealed case 307 so that a potential difference generated between the negative electrode 301 and the positive electrode 303 can be output to the outside. Incidentally, the inside of the sealed case 307 is filled with an electrolytic solution 306.

Figure 4:
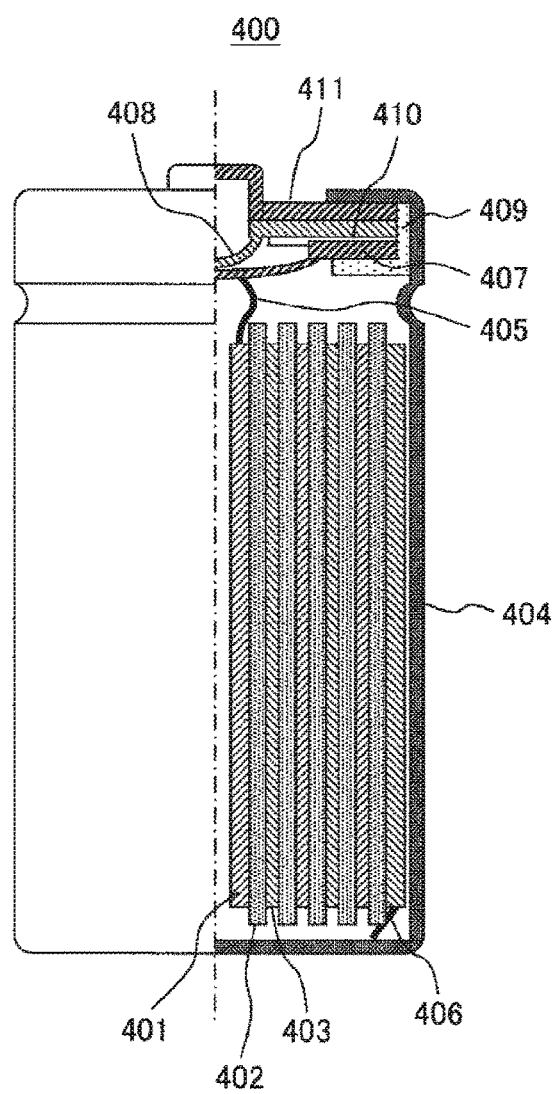
FIG. 4 is a schematic half-sectional view showing another example of the lithium ion secondary battery according to the present invention.

FIG. 4 is a schematic sectional view showing another example (wound type) of the lithium ion secondary battery according to the present invention. As shown in FIG. 4, a lithium ion secondary battery 400 according to the present invention is configured by laminating and winding a positive electrode 401, a separator 402, and a negative electrode 403 according to the present invention. A positive electrode tab 405 is connected to the positive electrode 401 and a negative electrode tab 406 is connected to the negative electrode 403. Further, the positive electrode tab 405 is connected to a battery lid 411 and the negative electrode tab 406 is connected to a battery can 404. By adopting such a structure, a potential difference generated between the positive electrode 401 and the negative electrode 403 can be output to the outside. In addition, the battery includes an inner lid 407, an internal pressure opening valve 408, a gasket 409, and a PTC (Positive Temperature Coefficient) element 410. The inside of the battery can 404 is filled with an electrolytic solution that conducts lithium ions (not shown).

The positive electrodes 303, 401 are not specifically limited and any material capable of occluding and releasing lithium may be used and, for example, $LiCoO_2$, $LiCo_{0.33}Ni_{0.33}Mn_{0.33}O_2$, $LiNiO_2$, $LiMn_2O_4$, $LiNi_{0.5}Mn_{1.5}O_4$, $LiFePO_4$, $LiMnPO_4$, or $Li_2FeSiO_4$ can be used.

The positive electrode current collector 304 is not specifically limited and any material less likely to degenerate in the battery and having electron conductivity may be used and copper, nickel, stainless and the like may be used. Among others, aluminum is preferably used. The thickness of the positive electrode current collector is not specifically limited and a positive electrode current collector having a thickness of 1 µm or more and 100 µm or less is preferably used.

An insulating porous material can be used for the separators 305, 402. The material thereof is not specifically limited and, for example, polypropylene, polyethylene or the like may be used.

As the electrolytic solution 306, a nonaqueous electrolytic solution including a nonaqueous solvent and lithium salt that dissolves in the solvent can be used. As the nonaqueous solvent, for example, a mixed solvent of propylene carbonate, ethylene carbonate, dimethyl carbonate, diethyl carbonate, dimethoxyethane, tetrahydrofuran, methyl acetate or the like can be used. As the lithium salt, lithium perchlorate, lithium hexafluorophosphate, lithium tetrafluoroborate, lithium trifluoromethanesulfonate or the like can be used. Also, vinylene carbonate, ethylene sulfite or the like may be added as an additive. In addition, instead of the nonaqueous electrolytic solution, a polymer gel electrolyte can be used. As the polymer gel electrolyte, for example, polyethylene oxide, polymethyl methacrylate, polyacrylonitrile or the like can be used.

The material of the sealed case 307 and the battery can 404 is selected from materials corrosion-resistant to a nonaqueous electrolyte such as aluminum, stainless steel, and nickel-plated steel. When the sealed case 307 and the battery can 404 are electrically connected to the positive electrodes 303, 401 or the negative electrodes 301, 403, the material of the sealed case 307 and the battery can 404 is selected such that a portion of the sealed case 307 and the battery can 404 in contact with the nonaqueous electrolytic solution 306 is not corroded or denatured by alloying with lithium ions.

Hereinafter, the present invention will be described still more concretely by means of examples.

Example 1

Production of the Negative Electrode Material 10 g of Si compound particles coated with carbon whose average particle size is 5 μm, 0.8 g of carbon fibers whose average diameter is 150 nm and whose average aspect ratio is 100, and 11 g of an NMP solution in which polyamide is dissolved 3% by weight are well mixed and dried in the atmosphere at 80° C. for three hours to remove the solvent. Subsequently, the obtained powder is thermally treated at 300° C. for one hour in the atmosphere to obtain the negative electrode material according to the present embodiment.
(Production of the Negative Electrode)

Next, 1.2 g of the obtained negative electrode material, 2.6 g of graphite, 4 g of an NMP solution in which polyvinylidene fluoride is dissolved 5% by weight, and 4 g of an NMP solution are well mixed and copper foil of the thickness 10 μm is coated therewith. Subsequently, the coated solution is dried in the atmosphere at 80° C. for three hours and then dried in a vacuum at 120° C. for two hours. Lastly, the negative electrode according to the present embodiment is obtained by increasing the negative electrode density up to 1.4 g/cm$^3$ by pressing at room temperature. The configuration of the negative electrode in Example 1 is shown in Table 1 described below. In Table 1, the mixed amount (wt %) of carbon fiber is a mixed amount for the total weight of the carbon coated negative electrode active material particles and carbon fibers.

Example 2

Production of the Negative Electrode Material 10 g of Si compound particles coated with carbon whose average particle size is 5 μm, 0.8 g of carbon fibers whose average diameter is 150 nm and whose average aspect ratio is 100, and 11 g of an aqueous solution in which sodium polyalginate is dissolved 3% by weight are well mixed and dried in the atmosphere at 80° C. for three hours to remove the solvent. Subsequently, the obtained powder is thermally treated at 300° C. for one hour in the atmosphere to obtain the negative electrode material according to the present embodiment.

Production of the Negative Electrode

Next, 1.2 g of the obtained negative electrode material, 2.6 g of graphite, and 4 g of an NMP solution in which polyvinylidene fluoride is dissolved 5% by weight are well mixed and copper foil of the thickness 10 μm is coated therewith. Subsequently, the coated solution is dried in the atmosphere at 80° C. for three hours and then dried in a vacuum at 120° C. for two hours. Lastly, the negative electrode according to the present embodiment is obtained by increasing the negative electrode density up to 1.4 g/cm$^3$ by pressing at room temperature. The configuration of the negative electrode in Example 2 is shown together in Table 1 described below.

Comparative Example 1

A negative electrode in Comparative Example 1 is obtained in the same manner as Example 1 except that instead of the carbon fiber, carbon black whose average primary particle size is 50 nm is used. The configuration of the negative electrode in Comparative Example 1 is shown together in Table 1 described below.

Comparative Example 2

1.2 g of Si compound particles coated with carbon whose average particle size is 5 μm, 2.8 g of graphite, 0.084 g of carbon fibers whose average diameter is 150 nm and whose average aspect ratio is 100, 4.3 g of an NMP solution in which polyvinylidene fluoride is dissolved 5% by weight, and 4 g of an NMP solution are well mixed and copper foil of the thickness 10 μm is coated therewith. Subsequently, the coated solution is dried in the atmosphere at 80° C. for three hours and then dried in a vacuum at 120° C. for two hours. Lastly, the negative electrode in Comparative Example 2 is obtained by increasing the negative electrode density up to 1.4 g/cm$^3$ by pressing at room temperature. The configuration of the negative electrode in Comparative Example 2 is shown together in Table 1 described below.

Comparative Example 3

A negative electrode in Comparative Example 3 is obtained in the same manner as Example 2 except that instead of sodium polyalginate, a 1:1 (weight ratio) mixture of styrene-butadiene rubber (tensile strength: 10 MPa) and carboxymethyl cellulose is used. The configuration of the negative electrode in Comparative Example 3 is shown together in Table 1 described below.

TABLE 1

Configurations of negative electrodes in Examples 1 and 2 and Comparative Examples 1 to 3

| | Negative electrode | | | | | | | | | |
|---|---|---|---|---|---|---|---|---|---|---|
| | Negative electrode material | | | | | | | | | |
| | Negative electrode active material | | Carbon fiber | | | | | | | |
| | Material name | Average particle size (μm) | Average length (μm) | Average diameter (nm) | Average aspect ratio | Mixed amount | Adhesive resin Material name | Carbon material | Binder resin | Remarks |
| Example 1 | Carbon coated Si compound particle | 5 | 15 | 150 | 100 | 7 wt % | Polyamide-imide | Graphite | Polyvinylidene fluoride | — |

TABLE 1-continued

Configurations of negative electrodes in Examples 1 and 2 and Comparative Examples 1 to 3

| | Negative electrode active material | Carbon fiber | | | | | | | |
|---|---|---|---|---|---|---|---|---|---|
| | Material name | Average particle size (μm) | Average length (μm) | Average diameter (nm) | Average aspect ratio | Mixed amount | Adhesive resin Material name | Carbon material | Binder resin | Remarks |
| Example 2 | Carbon coated Si compound particle | 5 | 15 | 150 | 100 | 7 wt % | Sodium polyalginate | Graphite | Polyvinylidene fluoride | — |
| Comparative Example 1 | Carbon coated Si compound particle | 5 | — | | | | Polyamide-imide | Graphite | Polyvinylidene fluoride | Instead of carbon fiber, carbon black is used |
| Comparative Example 2 | Carbon coated Si compound particle | 5 | 15 | 150 | 100 | 7 wt % | — | Graphite | Polyvinylidene fluoride | One stage synthesis |
| Comparative Example 3 | Carbon coated Si compound particle | 5 | 15 | 150 | 100 | 7 wt % | Styrene-butadiene rubber/carboxymethyl cellulose | Graphite | Polyvinylidene fluoride | — |

(Evaluation)

Lithium ion secondary batteries are produced using the negative electrodes in Examples 1 and 2 and Comparative Examples 1 to 3 produced above to evaluate capacity maintenance rates. First, test batteries in which a circular shape of 16 mm in diameter is punched out from the negative electrodes in Examples 1 and 2 and Comparative Examples 1 to 3 and used as a work electrode and a lithium metal plate is used as a counter electrode and a reference electrode are created to evaluate the capacity maintenance rate after ten charge and discharge cycles. Here, a mixed solution of ethylene carbonate, dimethyl carbonate, and ethylmethyl carbonate containing 1.0 mol/L of lithium hexafluorophosphate is used as the electrolytic solution. A porous polyethylene film of the thickness 25 μm is used as the separator that separates the work electrode, the counter electrode, and the reference electrode. Next, charge and discharge cycle conditions are shown. First, the battery is charged by a constant current of the current value corresponding to 0.2 CA until 0.01 V is reached and then, charged by a constant voltage of 0.01 V until the current value is 0.01 CA. Next, after a pause of 30 min, the battery is discharged by a constant current of the current value corresponding to 0.2 CA up to 1.5 V and then a pause of 30 min is inserted again. The above operation is set as one cycle and ten charge and discharge cycles are repeated and then, the ratio of the discharge capacity in the 10th cycle to the discharge capacity in the 1st cycle is evaluated as the capacity maintenance rate. Evaluation results are shown in Table 2 described below.

TABLE 2

Evaluation results lithium ion secondary batteries in Examples 1 and 2 and Comparative Examples 1 to 3

| | Capacity maintenance rate (%) |
|---|---|
| Example 1 | 65 |
| Example 2 | 64 |
| Comparative Example 1 | 48 |
| Comparative Example 2 | 35 |
| Comparative Example 3 | 37 |

As shown in Table 2, the negative electrodes in Examples 1 and 2 exhibit higher capacity maintenance rates than those of the negative electrodes in Comparative Examples 1 to 3. The negative electrode in Comparative Example 2 has approximately the same amount of carbon fiber as in Examples 1 and 2, but is produced in one stage like the conventional technology. The capacity maintenance rate of Comparative Example 2 is lower than that of Examples 1 and 2 because carbon fibers are not efficiently bonded to the negative electrode active material and carbon fibers that do not contribute to a charge and discharge are considered to arise.

Polyamide-imide and sodium polyalginate are used as adhesive resins in Examples 1 and 2, but that a similar effect is achieved when polyimide and sodium polyalginate are used is separately confirmed.

According to the present invention, as shown above, a negative electrode material for a lithium ion secondary battery capable of providing a lithium ion secondary battery that does not need heat treatment in a vacuum or an inert atmosphere, has a high initial capacity, and gets a small reduction in capacity in the charge and discharge cycle can be provided.

The above embodiments and examples have been described to help understand the present invention and the present invention is not limited to the concrete configurations described above. For example, a portion of the configuration of one example may be replaced with the configuration of another example or the configuration of one example may be added to the configuration of another example. That is, in the present invention, a portion of the configuration of an embodiment or an example may be deleted or replaced with another configuration, or another configuration may be added thereto.

REFERENCE SIGNS LIST

100 Negative electrode material
101, 101' Negative electrode active material particle
102, 102' Carbon (coated carbon)
103, 103' Carbon fiber
104, 104' Adhesive resin
200 Negative electrode
201 Negative electrode material
202 Carbon material
203 Binder resin
204 Negative electrode current collector
300, 400 Lithium ion secondary battery
301 Negative electrode
302 Negative electrode current collector
303 Positive electrode
304 Positive electrode current collector
305 Separator
306 Electrolytic solution
307 Sealed case
401 Positive electrode
402 Separator
403 Negative electrode
404 Battery can
405 Positive electrode tab
406 Negative electrode tab
407 Inner lid
408 Internal pressure opening valve
409 Gasket
410 PTC element
411 Battery lid

The invention claimed is:

1. A negative electrode material for a lithium ion secondary battery comprising a particle of a negative electrode active material that occludes and releases lithium ions, and a carbon fiber,
wherein the negative electrode active material occludes lithium by forming an alloy with the lithium,
a surface of the particle of the negative electrode active material is coated with carbon, and
the carbon fiber is bonded to the surface of the carbon via an adhesive resin.

2. The negative electrode material for a lithium ion secondary battery according to claim 1, wherein an average length of the carbon fiber is longer than an average particle size of the particle of the negative electrode active material coated with the carbon.

3. The negative electrode material for a lithium ion secondary battery according to claim 1, wherein the adhesive resin has a tensile strength of 50 MPa or more.

4. The negative electrode material for a lithium ion secondary battery according to claim 1, wherein the adhesive resin is at least one resin selected from polyimide, polyamide-imide, polyalginic acid salt, and polyacrylic acid salt.

5. The negative electrode material for a lithium ion secondary battery according to claim 1, wherein the negative electrode active material is silicon or a silicon compound.

6. A negative electrode for a lithium ion secondary battery created by a layer including a negative electrode material containing a particle of a negative electrode active material that occludes and releases lithium ions and a carbon fiber, a carbon material that occludes and releases the lithium ions, and a binder resin being formed on a current collector,
wherein the negative electrode active material occludes lithium by forming an alloy with the lithium,
a surface of the particle of the negative electrode active material is coated with carbon, and
the carbon fiber is bonded to the surface of the carbon via an adhesive resin.

7. The negative electrode for a lithium ion secondary battery according to claim 6, wherein the carbon material is graphite.

8. The negative electrode for a lithium ion secondary battery according to claim 6, wherein an average length of the carbon fiber is longer than an average particle size of the particle of the negative electrode active material coated with the carbon.

9. The negative electrode for a lithium ion secondary battery according to claim 6, wherein the adhesive resin has a tensile strength of 50 MPa or more.

10. The negative electrode for a lithium ion secondary battery according to claim 6, wherein the adhesive resin is at least one resin selected from polyimide, polyamide-imide, polyalginic acid salt, and polyacrylic acid salt.

11. The negative electrode for a lithium ion secondary battery according to claim 6, wherein the negative electrode active material is silicon or a silicon compound.

12. A lithium ion secondary battery comprising: a positive electrode; a negative electrode; and a nonaqueous electrolytic solution,
wherein the negative electrode is created by a layer including a negative electrode material containing a particle of a negative electrode active material that occludes and releases lithium ions and a carbon fiber, a carbon material that occludes and releases the lithium ions, and a binder resin being formed on a current collector,
the negative electrode active material occludes lithium by forming an alloy with the lithium,
a surface of the particle of the negative electrode active material is coated with carbon, and
the carbon fiber is bonded to the surface of the carbon via an adhesive resin.

13. A manufacturing method of a negative electrode material for a lithium ion secondary battery comprising:
a negative electrode material solution preparation step of mixing a particle of a negative electrode active material coated with carbon and forming an alloy with lithium to occlude the lithium, a carbon fiber, and a solution in which an adhesive resin is dissolved in a solvent; and
a drying step of removing the solvent by heating the solution of the negative electrode material.

14. A manufacturing method of a negative electrode for a lithium ion secondary battery comprising:
a negative electrode material solution preparation step of mixing a particle of a negative electrode active material coated with carbon and forming an alloy with lithium to occlude the lithium, a carbon fiber, and a solution in which an adhesive resin is dissolved in a solvent;
a first drying step of obtaining a negative electrode material by heating solution of the negative electrode material to remove the solvent;
a negative electrode slurry preparation step of mixing the negative electrode material, a carbon material that occludes and releases lithium ions and a solution in which a binder resin is dissolved in the solvent;

a coating step of coating a current collector with slurry of the negative electrode; and a second drying step of drying the slurry of the negative electrode with which the current collector is coated.

15. The manufacturing method of a negative electrode for a lithium ion secondary battery according to claim 14, wherein the solvent that dissolves the binder resin does not dissolve the adhesive resin.

* * * * *